United States Patent Office 3,206,399
Patented Sept. 14, 1965

3,206,399
DIESEL LUBRICATING OIL
Robert H. Davis, Woodbury, and Richard G. Ramge, Sewell, N.J., assignors to Socony Mobil Oil Company, Inc., a corporation of New York
No Drawing. Filed Sept. 29, 1961, Ser. No. 141,580
3 Claims. (Cl. 252—40.5)

The invention relates to lubricating oil compositions for use in diesel engines. More particularly, it is concerned with lubricating oils suitable for use in large, low-speed marine diesel engines.

In a copending application of Robert H. Davis, Serial No. 120,938, filed June 30, 1961, there is disclosed and claimed calcium acetate oil dispersions containing certain N-acyl-substituted sarcosines as stabilizing agents. As pointed out in the copending application, these "single-phase" stabilized calcium acetate oil dispersions are highly desirable for use as marine diesel lubricants, offering the advantage over emulsion-type lubricating oils of superior storage stability. Also, due to their high acid-neutralizing power, the calcium acetate dispersions greatly minimize corrosion problems normally associated with the operation of diesel engines. They also exhibit advantageous extreme pressure and anti-wear properties.

Although the stabilized "single-phase" calcium acetate oil dispersions thus provide many highly desirable properties for use as marine diesel oils, experience in such use has indicated certain deficiencies therein. Thus, in the operation of "trunk-type" diesels, wherein the oil is continuously recycled to the cylinders, it is essential that the oil exhibit the highest possible resistance to oxidation. The calcium acetate dispersions, however, exhibit relatively low oxidation resistance. It has also been found that the calcium acetate dispersion oils are adversely affected by contamination with water, such as can occur in the course of handling and shipping. This sensitivity to water can cause separation of calcium acetate from the oil and formation of undesirable gelatinous deposits in the engine.

It has been found in accordance with the present invention that marine diesel oils having outstanding high temperature oxidation and water-resisting properties are provided by the incorporation in the N-acyl-sarcosine stabilized calcium acetate dispersion of a minor proportion of an oil-soluble carbonated sulfurized basic calcium alkyl phenate.

It has been found, furthermore, that the use of the carbonated, sulfurized basic calcium alkyl phenate additive in combination with the stabilized calcium acetate dispersion provides marine diesel oils which form friable port deposits of the type which break away during operation of the engine and do not contribute to exhaust port closure. The low port-clogging tendency of the oil thus provided by the invention is surprising in that the use of phenolic-type additives in marine diesel oils, though advantageous in other respects, ordinarily has the drawback that they contribute to the formation of hard, tenacious port deposits of the type which cause exhaust port clogging. The use of the carbonated, sulfurized basic calcium alkyl phenate in the calcium acetate dispersion oils, however, does not result in this type of deposit. The present invention, therefore, provides a marine diesel oil composition having high oxidation stability and water-resistivity, as well as low port-clogging tendencies.

Accordingly, it is a prime object of this invention to provide a new and highly advantageous marine diesel oil composition comprising an N-acyl-substituted sarcosine-stabilized calcium acetate dispersion having incorporated therein a minor amount of a carbonated, sulfurized basic calcium alkyl phenate. Other and further objects of the invention will be apparent from the following description thereof.

As pointed out in the aforesaid copending application, the N-acyl-substituted sarcosines which are utilized as stabilizers for the calcium acetate oil dispersions in accordance with the invention conform to the formula:

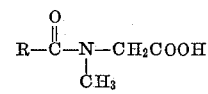

wherein R represents an aliphatic hydrocarbon radical having from about 8 to about 24 carbon atoms and which may be either saturated or unsaturated. Typical examples of these sarcosines are the following:

N-pelargonoyl sarcosine
N-undecyloyl sarcosine
N-lauroyl sarcosine
N-myristoyl sarcosine
N-palmitoyl sarcosine
N-stearoyl sarcosine
N-oleoyl sarcosine
N-linoleoyl sarcosine
N-arachidoyl sarcosine
N-behenoyl sarcosine
N-heyenoyl sarcosine A number of the N-acyl-substituted sarcosines are available commercially under the trade name "Sarkosyl," for example, "Sarkosyl L" (lauroyl sarcosine), "Sarkosyl O" (oleoyl sarcosine) and "Sarkosyl S" (stearoyl sarcosine).

As further pointed out in the copending application, either anhydrous or hydrated calcium acetate may be used in forming the calcium acetate oil dispersions. The calcium acetate may either be preformed or it may be formed in situ. When using preformed calcium acetate, the dispersion is prepared by forming a mixture of the calcium acetate, the N-acyl-sarcosine and the base oil and stirring the mixture for a short period, say, from a few seconds up to about 30 minutes at a temperature of from about 25° C. to about 200° C. and preferably from about 50° C. to about 150° C. Although stable dispersions can be formed at room temperature with only a brief initial mixing of the calcium acetate, the sarcosine compound and the oil and allowing the mixture to stand for several hours, its formation is considerably hastened by heating and stirring the mixture. Also, if desired, the mixture may be subjected to a mechanical homogenization treatment although this step is not essential.

The calcium acetate may be prepared in situ by neutralizing calcium oxide or calcium hydroxide with either acetic anhydride or acetic acid in the presence of the oil and then heating the mixture to a temperature sufficient to remove any free water therefrom, i.e., above 100° C. The N-acyl-sarcosine is then added and the dispersion formed as in the case of the preformed calcium acetate.

The oil compositions of the present invention are prepared simply by blending the carbonated, sulfurized basic calcium alkyl phenate additive with the calcium acetate dispersion and, if necessary, then diluting the blend with additional base oil to obtain the desired final oil viscosity.

The sulfurized basic calcium alkyl phenates, which after carbonation are utilized in the present invention, are fully described in U.S. Patent No. 2,680,096. The carbonated version of these additives is fully disclosed in a copending application of Ferdinand P. Otto, Serial No. 782,660, filed December 24, 1958, now U.S. Patent No. 3,036,971, issued May 29, 1962.

As shown in Patent No. 2,680,096, the basic sulfurized calcium phenates contain a ratio of equivalents of calcium to equivalents of phenol which is substantially greater than that of the corresponding "normal" sulfurized calcium phenates. Thus, they contain up to about two full equivalents of calcium per equivalent of phenol as compared to the corresponding normal salts which contain only one equivalent of calcium per equivalent of phenol. On a percentage basis, therefore, the basic sulfurized calcium phenates contain up to 100%, or more, of calcium over that contained in the corresponding normal salts.

As shown in Serial No. 782,660, the carbonation of the sulfurized basic calcium alkyl phenate is carried out by dissolving the basic salt in a suitable diluent, such as mineral oil, heating the solution to a temperature of from about 200° F. to about 400° F. and passing carbon dioxide through the heated solution for a time sufficient to incorporate from about 0.2 mol to about 0.6 mol of carbon dioxide per mol of calcuim into the basic salt.

The following example illustrates the preparation of a typical carbonated, sulfurized basic calcium alkyl phenate salt viz., the carbonated, sulfurized basic calcium alkyl phenate of propylene tetramer-substituted phenol.

EXAMPLE 1

(a) *Preparation of propylene tetramer alkylated phenol*

A mixture consisting of 300 parts, by weight, of phenol, 555 parts, by weight, of a polypropylene comprised essentially of propylene tetramer (average M.W.=170) and 45 parts, by weight, of acid-treated clay were heated at 300° F. for a period of 12 hours after which time the mixture was filtered. The filtered mixture was then heated to 530° F. to remove unreacted phenol and olefin polymers. The resulting propylene tetramer-alkylated phenol product had a boiling range of 560° F. to 700° F.

(b) *Preparation of sulfurized basic calcium phenate of propylene tetramer-alkylated phenol*

A mixture of 600 parts, by weight, of the alkylated phenol product of (a), above, 173 parts, by weight, of calcium hydroxide, 58 parts, by weight, of sulfur and 300 parts, by weight, of ethylene glycol was heated at 300° F. with agitation at an absolute pressure of 300 millimeters of mercury. After the water of reaction had been distilled off, the pressure was reduced to 60 millimeters of mercury and the temperature raised to 380° F., at which temperature and pressure the ethylene glycol was removed. During the period when the ethylene glycol was being removed, 1000 parts, by weight, of petroleum lubricating oil were added. When all of the ethylene glycol had been removed, the mixture was cooled and 200 parts, by weight, of a petroleum thinner were added and the mixture filtered. The filtrate was heated at reduced pressure to remove the petroleum thinner. The final lubricating oil solution (containing about 40% of the basic calcium salt product) analyzed 2.9% sulfur and 4.4% calcium; the basic sulfurized calcium alkyl phenate containing about 70% more calcium than that present in the corresponding normal alkyl phenate.

(c) *Preparation of carbonated, sulfurized basic calcium phenate of propylene tetramer-alkylated phenol*

Thirty gallons of a product prepared as in (b) and having sulfur and calcium contents similar thereto was charged to a 50-gallon steam heated, glass-lined kettle. The additive was heated to a temperature of 300° F. and constantly agitated with an anchor type stirrer, while carbon dioxide was introduced into the liquid through a ¼" copper tube at a rate of 10 pounds per hour. The treatment was continued for four hours.

Samples taken hourly showed no evidence of deposits or change in clarity. $CO_2$ contents were as follows:

| Hours: | Percent $CO_2$ combined in additive |
|---|---|
| 0 | 0.1 |
| 1 | 1.4 |
| 2 | 1.6 |
| 3 | 1.7 |
| 4 | 1.9 |

Analysis of 4-hour product:
| | |
|---|---|
| Percent Ca | 4.4 |
| Percent $Co_2$ | 1.9 |
| K.V. at 210° F., cs. | 25.05 |
| Percent S | 2.8 |

The preparation of a marine diesel oil composition typical of the invention is shown in the following example:

EXAMPLE 2

(a) *Preparation of stabilized calcium acetate-oil dispersion*

| Materials used: | Amount (parts by weight) |
|---|---|
| Calcium acetate (containing 6% water, i.e., approximately ⅔ mol water of hydration) | 40 |
| Oleoyl sarcosine | 3 |
| Base oil (Solvent-refined coastal, SUV=500 @ 100° F.) | 57 |

*Procedure.*—The oleoyl sarcosine was added to a slurry of the calcium acetate in the base oil and the mixture stirred and heated over a period of ½ hour to a final temperature of about 135° C. The mixture was then cooled to about 80° C. and passed through a Manton-Gaulin homogenizer operating at 3000 p.s.i. The resulting dispersion had excellent fluidity and exhibited only a slight haze.

(b) *Preparation of marine diesel oil composition*

To 80 parts (by weight) of base oil (a mixture of 72 parts of solvent-refined coastal stock, SUV=500 @ 100° F. and 8 parts of solvent-refined coastal bright stock, SUV=3300 @ 100° F.), there was added with stirring 10 parts of the calcium acetate dispersion prepared in (a) and 10 parts, by weight, of the carbonated, sulfurized basic calcium alkyl phenate of propylene tetramer-alkylated phenol (Example 1). The resulting oil was an optically clear SAE 50-grade oil having a TBN (total base number) of 40 as determined by ASTM Method D–664.

The marked improvement in the high temperature oxidation stability and water resistance of the calcium acetate dispersion affected by the incorporation of the carbonated, sulfurized basic calcium alkyl phenate and the unexpectedly low port-clogging tendencies of the oil compositions of the invention have been demonstrated by the following tests.

*Oxidation stability test.*—This test determines the stability of an oil under high temperature catalytic oxidation conditions. This test is conducted as follows: A 25 cc. sample of the oil is placed in a 200 x 25 mm. test tube with 15.6 square inches of sand-blasted iron wire, 0.78 square inch of polished copper wire, 0.87 square inch of polished aluminum wire and 0.167 square inch of polished lead surface. The oil is heated to 325° F. and dry air is passed through it at a rate of 10 liters per hour for a period of 40 hours. The viscosity of the oil is determined before and after the test as a measure of the extent to which the oil is oxidized during the test. Thus, the greater the increase in the viscosity of the oil the greater the deterioration of the oil. The results of this test are given in Table I.

TABLE I.—OXIDATION TEST

| Oil Composition Tested | KV @ 210° F. Initial | KV @ 210° F. Final | Percent Viscosity Increase |
|---|---|---|---|
| Example 2(a) | 19.28 | 58.95 | 206 |
| Example 2(b) | 18.32 | 20 | 9 |

It is seen from these results that the extent of oxidation of the oil composition of the invention containing the carbonated, sulfurized basic calcium phenate additive [Example 2(b)] was extremely small while that of the stabilized calcium acetate dispersion alone [Example 2(a)] was substantial.

*Check valve test.*—This test indicates the ability of a marine diesel oil which has been contaminated with water to resist decomposition under the high temperature conditions existing in check valves and lines running along the engine exterior and into the cylinder wall. Thus, decomposition products of an inferior lubricant will prevent lubricant flow, while decomposition products of a good lubricant will remain pumpable and provide lubrication along with the oil. In this test 5 parts of the test oil and 95 parts of water are shaken together and the mixture allowed to settle. The heavy severely water-contaminated portion which settles out is separated and subjected to a check valve pumping test as follows. A Manzell lubricator and check valve (opening pressure 50–60 p.s.i.) are used. The valve and associated piping are maintained at 300° F. in an oven while the oil is pumped through the valve. The test is continued for 14 days or until either (1) the oil becomes unpumpable or (2) deposits in the valve prevent flow of oil therethrough. A good oil will function throughout the test. An inferior oil will not.

In the comparative tests conducted on the stabilized calcium acetate dispersion of Example 2(a) and the oil composition of the present invention, Example 2(b), it was found that the former oil forms a grease, i.e., it becomes unpumpable, and fails the test in approximately 4 days, while the latter oil functions for the entire duration of the test. Accordingly, it is seen that the oil composition of the invention, utilizing the carbonated, sulfurized basic calcium alkyl phenate in combination with the dispersed calcium acetate, exhibits excellent water-resistivity, whereas the calcium acetate dispersion oil, without the carbonated, sulfurized basic calcium alkyl phenate, is inferior in this respect.

*Marine port-clogging test.*—This test measures the port-clogging tendencies of a marine diesel oil. A Homelite 2-cycle engine is operated under conditions to produce port deposits in a short time. The apparatus consists of four parts: (1) a motored Homelite 2-cycle engine, (2) an external lubrication system to meter the test lubricant through three points around the Homelite cylinder, (3) a fuel burner to produce combustion gases and (4) a duct system to guide the exhaust gases from the burner through the exhaust ports of the Homelite engine. The engine operating conditions are as follows:

| | |
|---|---|
| Speed _____r.p.m__ | 36 |
| Fuel consumption _____lbs./hr__ | 1.45 |
| Air/fuel ratio _____ | 12:1 |
| Preheated temperature _____° F__ | 200 |
| Exhaust temperature _____° F__ | 700–800 |
| Smoke level (Bacharach smoke scale) _____ | 10×9+ |
| Oil feed rate _____gms./hr__ | 27 |
| Duration of test _____hours__ | 6 |

The amount and type of exhaust port deposits formed are rated visually at the end of the test. The test results are presented in Table II.

TABLE II.—MARINE PORT-CLOGGING TEST

| Oil Tested | TBN | Percent Port Clogging | Nature of Deposit |
|---|---|---|---|
| Oil containing carbonated, sulfurized basic calcium phenate of propylene tetramer-alkylated phenol [Example 1(c)] only. | 40 | 55 | Hard and tenacious. |
| Example No. 2(b) | 40 | 30 | Soft and dry. |

It will be observed from Table II that the amount of port clogging obtained by the use of the calcium acetate-phenate combination is almost ½ less than that with the phenate alone and that the type of deposit in the one is of the soft type not conducive to port closure, while that of the latter is of the hard type which induces port closure.

Although the oil composition of the invention shown in Example 2(b), on the basis of the active ingredients, contained 4% of calcium acetate, 0.3% of oleoyl sarcosine and 4% of the carbonated, sulfurized basic calcium alkyl phenate additive, it will be appreciated that the amounts of the respective additives can be varied considerably within the scope of the invention, the specific amounts used depending upon the particular operating conditions encountered, such as the sulfur content of the fuel being used, etc. In general, therefore, the amount of calcium acetate additive employed may suitably range from about 0.5% to about 20%, while the amount of the sarcosine compound may vary from about 0.05% to about 5%, the preferred amounts being from about 2% to about 8% and from about 0.1% to 2.0%, respectively. Correspondingly, the concentration of the carbonated, sulfurized basic calcium alkyl phenate additive may range from about 0.5% to about 20%, the preferred amount being from about 2% to about 8%. It will be understood that the amounts of the several additives recited herein, including the following claims, in all cases represent weight percentages of the active ingredients, i.e., the additive compounds per se.

The oil compositions of this invention may also contain other additives designed to provide various improving effects therein, such as antioxidants, detergents, viscosity improvers, pour point depressants, anti-rust agents, defoamants, etc.

Although the present invention has been described in terms of specific embodiments and examples thereof, it is not intended that the scope of the invention be limited in any way thereby except as indicated in the following claims.

What is claimed is:

1. A single-phase lubricating oil composition having improved high temperature oxidation properties comprising a major proportion of a mineral lubricating oil, from about 0.5% to about 20% of calcium acetate, from about 0.05% to about 5% of an N-acyl-substituted sarcosine compound of the formula

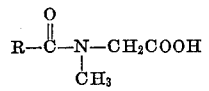

where R represents an aliphatic hydrocarbon radical of from about 8 to about 24 carbon atoms and from about 0.5% to about 20% of a carbonated, sulfurized basic calcium alkyl phenate having from about 4 to about 30 carbon atoms per alkyl group therein.

2. A single-phase lubricating oil composition having improved high temperature oxidation properties comprising a major proportion of a mineral lubricating oil, from about 0.5% to about 20% of calcium acetate, from about 0.05% to about 5% of oleoyl sarcosine and from about 0.5% to about 20% of a carbonated, sulfurized basic calcium alkyl phenate of propylene tetramer-alkylated phenol.

3. A single-phase lubricating oil composition having improved high temperature oxidation properties comprising a major proportion of a mineral lubricating oil, from about 2% to about 8% of calcium acetate, from about 0.1% to about 2% of oleoyl sarcosine and from about 2% to about 8% of a carbonated, sulfurized basic calcium alkyl phenate of propylene tetramer-alkylated phenol.

References Cited by the Examiner

UNITED STATES PATENTS

| | | | |
|---|---|---|---|
| 2,790,779 | 4/57 | Spivack et al. | 252—51.5 |
| 2,916,454 | 12/59 | Bradley et al. | 252—42.7 |
| 2,927,892 | 3/60 | Morway | 252—39 |
| 2,929,783 | 3/60 | Morway | 252—40.5 |
| 2,940,932 | 6/60 | Morway | 252—40.5 |
| 2,944,023 | 7/60 | Kolarik | 252—49.5 X |
| 3,019,187 | 1/62 | Panzer et al. | 252—40.7 |
| 3,036,971 | 5/62 | Otto | 252—42.7 |

FOREIGN PATENTS 844,426    8/60    Great Britain.

OTHER REFERENCES

Geigy Surfactants, Geigy Industrial Chemicals, copyright 1959; page 2 relied on.

Zussman et al.: "Acylated Amino Acids in Shampoos." in Journal of the Society of Cosmetic Chemists, vol. 6, No. 5, December 1955; pages 407–415.

DANIEL E. WYMAN, *Primary Examiner.*

JOSEPH R. LIBERMAN, *Examiner.*